US010206108B2

(12) United States Patent
Lu et al.

(10) Patent No.: US 10,206,108 B2
(45) Date of Patent: Feb. 12, 2019

(54) DEVICE AND METHOD FOR SMART HOME

(71) Applicant: Lenovo (Beijing) Co., Ltd., Beijing (CN)

(72) Inventors: Jianwei Lu, Beijing (CN); Changlei Gao, Beijing (CN); Xiaorui Zhao, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 501 days.

(21) Appl. No.: 14/752,110

(22) Filed: Jun. 26, 2015

(65) Prior Publication Data

US 2016/0285644 A1 Sep. 29, 2016

(30) Foreign Application Priority Data

Mar. 24, 2015 (CN) .......................... 2015 1 0131931
Apr. 3, 2015 (CN) .......................... 2015 1 0159067

(51) Int. Cl.
*G06F 15/173* (2006.01)
*H04W 12/08* (2009.01)
*H04L 12/64* (2006.01)
*H04W 12/06* (2009.01)

(52) U.S. Cl.
CPC ......... *H04W 12/08* (2013.01); *H04L 12/6418* (2013.01); *H04W 12/06* (2013.01)

(58) Field of Classification Search
USPC ....................................................... 709/223
See application file for complete search history.

(56) References Cited

U.S. PATENT DOCUMENTS

2016/0352723 A1* 12/2016 Li ...................... H04L 63/0853

FOREIGN PATENT DOCUMENTS

| CN | 201251828 | 6/2009 |
| CN | 104202306 | 12/2014 |
| CN | 104282124 | 1/2015 |
| CN | 104394044 | 3/2015 |

OTHER PUBLICATIONS

First Office Action dated Jul. 5, 2017 (11 pages including English translation) out of Chinese priority Application No. 201510131931.X.
First Office Action dated Mar. 24, 2017 (14 pages) out of Chinese priority Application No. 201510159067.4.
Office Action, and English language translation thereof, in corresponding Chinese Application No. 201510159067.4, dated Dec. 8, 2017, 22 pages.
Second Office Action dated Mar. 2, 2018 (11 pages including English translation) out of Chinese priority Application No. 201510131931.X.

* cited by examiner

*Primary Examiner* — Hee Soo Kim
(74) *Attorney, Agent, or Firm* — Brinks Gilson & Lione; John C. Freeman

(57) ABSTRACT

A method and device for smart home are described and include a second device obtaining first identification information for identifying a first device with the second device transmitting the first identification information to a server through a second data channel, wherein, the first identification information is used for the server to establish a binding relationship between the first device and the second device, the binding relationship indicating that the first device and the second device belong to the same user.

16 Claims, 7 Drawing Sheets

DEVICE AND METHOD FOR SMART HOME

This application claims priority to Chinese Patent Application No. 201510131931.X filed on Mar. 24, 2015, and to Chinese Patent Application No. 201510159067.4 filed on Apr. 3, 2015; the entire contents of which are incorporated herein by reference.

BACKGROUND

The present disclosure relates to the smart home field, and particularly to a device and a method for smart home.

Currently, with the development of the information technology, in order to meet the increasing requirement on automation and networking, the smart home field has been greatly developed. In a smart home environment, generally, there are devices such as portable terminals, for example, a cell phone, a tablet, or the like, a hub device, a household device also known as a small smart device, for example, a smart lock, a lamp, or the like. When the network including the above devices begins to work, firstly, these devices need to be bound with each other.

On the other hand, with the development of the smart home technology, the household device is accessed to a server side through a smart hub. People may establish a link rule for the devices connected to the hub by logging in their accounts, so as to control their devices remotely, and prompt information may be sent to the user when an abnormal situation is detected by the device. However, in the current smart monitoring, only the devices connected to the hub in the user's own family can be monitored. In practice use, there is a need to establish a link between a device connected to one user's hub and a device connected to another user's hub. For example, it will be very useful if a gas sensitive device as a fire alarm sensor is linked between neighbors or even a property manager.

SUMMARY

According to an embodiment of the present disclosure, a method for smart home is provided, comprising: a second device obtaining first identification information for identifying a first device; and the second device transmitting the first identification information to a server through a second data channel, wherein, the first identification information is used for the server to establish a binding relationship between the first device and the second device, the binding relationship indicating that the first device and the second device belong to the same user.

According to another embodiment of the present disclosure, a device for smart home is provided, comprising: an receiving unit operative to obtain first identification information for identifying a first device; and a transmitting unit operative to transmit the first identification information to a server through a second data channel, wherein, the first identification information is used for the server to establish a binding relationship between the first device and a second device as the device for smart home, the binding relationship indicating that the first device and the second device belong to the same user.

According to another embodiment of the present disclosure, a device for smart home is provided, comprising: a processor; a memory; and computer program instructions stored in the memory, which when being executed by the processor, performs the following steps: obtaining first identification information for identifying a first device; and transmitting the first identification information to a server through a second data channel, wherein, the first identification information is used for the server to establish a binding relationship between the first device and the second device, the binding relationship indicating that the first device and the second device belong to the same user.

According to another embodiment of the present disclosure, a computer program product is provided, which is embodied with computer program instructions thereon, which, when being executed by a computer comprising a processor, performs the steps of the method as described above.

DETAILED DESCRIPTION

The embodiments of the present disclosure will be described in detail with reference to the accompany figures.

The disclosure is directed to controlling of Internet of Things (IoT) devices based on detecting a device and obtaining control information and linkage rules for controlling the device. The control functions available to a smart controller and/or server can vary based on the condition of the various rules and/or the interaction of the various devices detected.

According to an embodiment of the present disclosure, a method for smart home is provided, comprising: a second device obtaining first identification information for identifying a first device; and the second device transmitting the first identification information to a server through a second data channel, wherein, the first identification information is used for the server to establish a binding relationship between the first device and the second device, the binding relationship indicating that the first device and the second device belong to the same user.

According to another embodiment of the present disclosure, a device for smart home is provided, comprising: an obtaining unit operative to obtain first identification information for identifying a first device; and a transmitting unit operative to transmit the first identification information to a server through a second data channel, wherein, the first identification information is used for the server to establish a binding relationship between the first device and a second device as the device for smart home, the binding relationship indicating that the first device and the second device belong to the same user.

Particularly, the method for smart home in the embodiments of the present disclosure may include a binding method and a link rule setting method. Hereinafter, exemplary embodiments will be described.

The binding method and the binding device according to the embodiments of the present disclosure are applied to the smart home environment. In the smart home environment, generally, there are devices such as portable terminals, for example, a cell phone, a tablet, or the like, a hub device, a household device also known as a small smart device, for example, a smart lock, a lamp, or the like. When the network including the above devices begins to work, firstly, these devices need to be bound with each other.

Hereinafter, the binding method according to an embodiment of the present disclosure will be described in detail with reference to FIG. 1.

Figure 1:
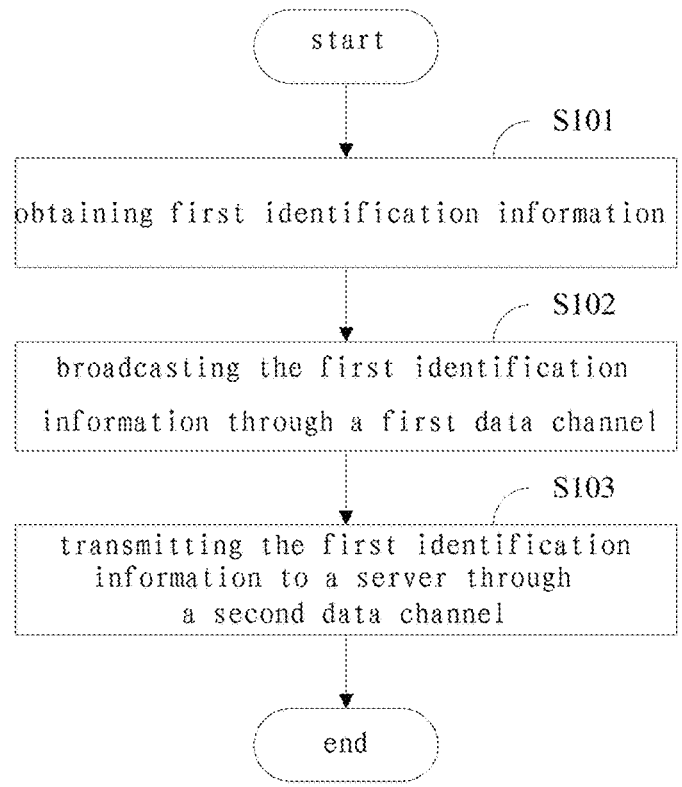
FIG. 1 is a flowchart showing a binding method according to an embodiment of the present disclosure.

As shown in FIG. 1, first, in a step S101, first identification information is acquired in the binding method according to the embodiment of the present disclosure. Particularly, the first identification information is used for identifying a first device. More particularly, in the binding method according to the embodiment of the present disclosure, the first identification information may be acquired from a memory of the first device or may be generated in random. The first identification information is, for example, a UUID (Universally Unique Identifier) of the first device.

Next, in a step S102, in the binding method according to the embodiment of the present disclosure, the first identification information is broadcasted through a first data channel. Particularly, the first data channel corresponds to a first communication protocol, for example, a short range (a level of a smart home network) communication protocol such as Bluetooth protocol. Thereby, a second device satisfying a first predetermined condition may obtain the first identification information. For example, in a case of the Bluetooth protocol, the second device within the communication range of Bluetooth can obtain the first identification information. The second device transmits the first identification information to the server after obtaining the same. Particularly, the first identification information may be transmitted to the server by the second device through a data channel such as a second data channel as described below. Alternatively, the second device may transmit the first identification information to the server through another data channel different from the first data channel and the second data channel.

On the other hand, in a step S103, in the binding method according to the embodiment of the present disclosure, the first identification information is transmitted to the server through a second data channel. Particularly, the second data channel corresponds to a second communication protocol such as a communication protocol of WiFi, 3G, 4G, or the like.

In a case that the server is connected with multiple smart home networks, the server can receive identification information transmitted from multiple devices in multiple smart home networks, including the identification information transmitted from the above first device and second device. Thereby, the server can compare the received identification information. When it is found that there are the same identification information (in this case, the first identification information), the server establishes a binding relationship between the first device and the second device. Particularly, the binding relationship indicates that the first device and the second device belong to the same user.

It is to be noted that the binding method according to the embodiment of the present disclosure may be applied to any one of the portable terminal, the hub device and the household device.

For example, in a first embodiment, the first device is a hub device, the second device is a portable terminal, and the binding method is applied to the hub device.

In this embodiment, first, the first identification information of the hub device is acquired from a memory of the hub device. The first identification information is, for example, a UUID of the hub device.

Next, the identification information of the hub device is broadcasted through a first data channel such as the Bluetooth protocol, so that the portable devices within the range of Bluetooth communication may obtain the identification information of the hub device. The portable terminal transmits the identification information of the hub device to the server after obtaining the same, through a second data channel corresponding to a communication protocol such as 3G, 4G, WiFi, or the like.

On the other hand, the identification information of the hub device is transmitted to the server through a second data channel corresponding to a communication protocol, such as 3G, 4G, WiFi, or the like.

Thereby, when the server compare the received identification information from multiple devices in multiple smart home networks, it will find that the identification information transmitted from the hub device is the same as that transmitted from the portable terminal, then it will associate the hub device with the portable terminal, that is, establishes a binding relationship between the hub device and the portable terminal. Particularly, the binding relationship indicates that the hub device and the portable terminal belong to the same user.

In a second embodiment, the first device is a portable terminal, the second device is a hub device, and the binding method is applied to the portable terminal.

In this embodiment, first, the first identification information of the portable terminal is acquired from a memory of the portable terminal. The first identification information is, for example, a UUID of the portable terminal.

Next, the identification information of the portable terminal is broadcasted through a first data channel such as the Bluetooth protocol, so that the hub devices within the range of Bluetooth communication may obtain the identification information of the portable terminal. The hub device transmits the identification information of the portable terminal to the server after obtaining the same, through a second data channel corresponding to a communication protocol such as 3G, 4G, WiFi, or the like.

On the other hand, the identification information of the portable terminal is transmitted to the server through a second data channel corresponding to a communication protocol, such as 3G, 4G, WiFi, or the like.

Thereby, when the server compare the received identification information from multiple devices in multiple smart home networks, it will find that the identification information transmitted from the portable terminal is the same as that transmitted from the hub device, then it will associate the portable terminal with the hub device, that is, establishes a binding relationship between the portable terminal and the hub device. Particularly, the binding relationship indicates that the hub device and the portable terminal belong to the same user.

Further, user identification information, such as a user name, may be transmitted to the server through the second data channel. The user identification information is used for the server to establish a binding relationship between the first device, the second device and the user. The binding relationship indicates that the first device and the second device belong to the user.

That is, in this embodiment, not only the hub device and the portable terminal may be bound so that the server may know that the hub device and the portable terminal belong to the same user, but also the server is enabled to know to which user the hub device and the portable terminal belong.

In a third embodiment, the first device is a hub device, the second device is a portable terminal, the third device is a household device, and the binding method is applied to the hub device. In this case, the first device is connected to a third device. Thereby, in this embodiment, the first identification information is transmitted to the third device, the first identification information being transmitted to the server by the third device, so that the server establishes a binding relationship between the first device and the third device, indicating that the hub device and the third device belong to the same user.

Thereby, in this embodiment, the hub device can not only be bound with the portable terminal, but also be bound with various household devices in the smart home environment.

Further, in a fourth embodiment, a control strategy may be received from the server, and the third device may be controlled based on the control strategy. Particularly, the control strategy is used to control an action mode of the third device. In a case in which there are multiple third devices and the multiple third devices are all bound with the hub device and the portable terminal, the control strategy about a link rule of the multiple third devices may be received from the server, and the multiple third devices are controlled. The link rule comprises, for example, a rule of the action mode of the multiple third devices in a time order, or the like. For example, when the multiple third devices comprise a door lock and a lamp, the link rule may be a rule that the lamp is on when the door lock is unlock, or a rule that the lamp is off when the door lock is locked, or the like.

More particularly, the control strategy may be generated by the server based on setting information transmitted by the second device. That is, in this embodiment, the user may set up the control strategy of the third device through the portable terminal as the second device, and transmit it to the server, so that the server transmits it to the hub device and performs control accordingly.

Of course, those skilled in the art may understand that the user may set up at the hub device directly when the hub device has the ability of setting up the control strategy. In this case, the portable terminal is not required to be bound with the hub device.

Further, in the above embodiment, the server establishes the binding relationship in response to receiving the same first identification information from the first device and the second device. Alternatively, in order to further improve the security and the accuracy, in a fifth embodiment, the server establishes the binding relationship in response to receiving the same first identification information from the first device and the second device and a network address for the first device and a network address for the second device being the same. That is, in this case, if the first identification information transmitted to the server from the first device and the second device are the same but their network addresses are different, the bonding relationship is not established. Thereby, in the binding method according to the embodiment of the present disclosure, the error binding of devices not belonging to the same smart home environment can be prevented.

Further, considering that the signal transmitted from devices in another smart home environment is generally weak, in order to improve the security in the binding process, the second device determines whether the first identification information satisfies a second predetermined condition. The second predetermined condition is, for example, the signal intensity of the received first identification information being larger than a preset threshold, the signal to noise ratio of the received first identification information being larger than a preset threshold, or the like. When it is determined that the first identification information does not satisfy the second predetermined condition, the first identification information is not transmitted to the server by the second device. The second device transmits the first identification information to the server when it is determined that the first identification information satisfies the second predetermined condition.

Thereby, in the binding method according to the embodiment of the present disclosure, the error binding of devices not belonging to the same smart home environment can be prevented. For example, it may prevent other neighbor from binding the hub device of the user, and may prevent the user from binding the hub device of the neighbor due to an error operation, or the like.

Further, in a sixth embodiment, considering that the hub device does not has a communication ability such as WiFi, 3G, 4G, or the like when it is powered up firstly or reset, in the binding method according to the embodiment of the present disclosure, the binding process may be combined with a networking process. Particularly, first, similarly to those in the steps S101 and S102, the hub device may perform a Bluetooth broadcast through a data channel corresponding to a protocol such as the Bluetooth protocol when the hub device is powered up firstly, the Bluetooth broadcast including a UUID number generated in random. Then, the portable terminal as the second device broadcasts the network parameter, such as the SSID and the password of the WiFi, of the environment in which the second device is located through the above data channel, after receiving the Bluetooth broadcast and acquiring the UUID of the hub device. Thereby, the hub device can receive the broadcasted network parameter, and access to the network using the received network parameter. Then, similarly to the above process, the hub device and the second device both transmit the UUID of the hub device to the server and the establishment of the binding relationship is performed.

Thereby, in the binding method according to the embodiment of the present disclosure, the above binding process can be achieved. The user does not need to configure the network parameter such as the network password, or the like, manually, to make the device access to the network.

The binding method according to the embodiment of the present disclosure has been described above. In the binding method according to the embodiment of the present disclosure, a certain device transmits its identification information to the server on one hand, and on the other hand broadcasts it so that the device receiving the identification information transmits the identification information to the server, and the server can bind the devices transmitting the same identification information. Thereby, the user does not need to log in the server by a certain device and then input or scan the identification information of another device. The binding efficiency is improved, the user operation is decreased, and the user experience is improved.

Hereinafter, the binding device according to the embodiment of the present disclosure will be described with reference to FIG. 2.

Figure 2:
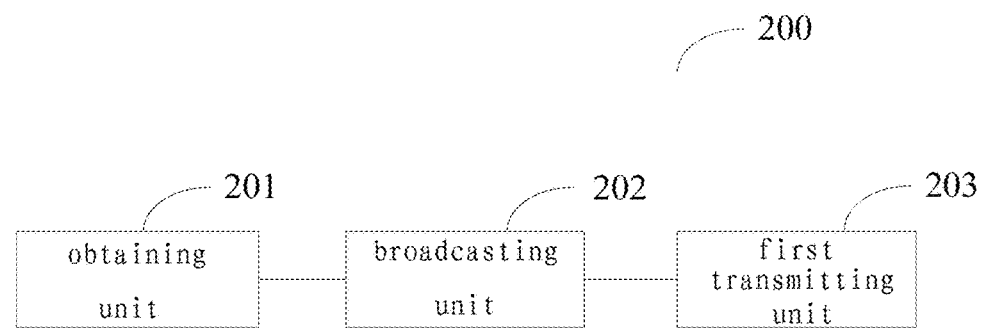
FIG. 2 is a block diagram showing a main configuration of a binding device according to an embodiment of the present disclosure.

As shown in FIG. 2, the binding device according to the embodiment of the present disclosure comprises an obtaining unit 201, a broadcasting unit 202 and a first transmitting unit 203.

The obtaining unit 201 is operative to obtain first identification information for identifying a first device.

The broadcasting unit 202 is operative to broadcast the first identification information through a first data channel, so that the second device satisfying a first predetermined condition obtains the first identification information, the first identification information being transmitted to the server by the second device.

The first transmitting unit 203 is operative to transmit the first identification information to a server through a second data channel, wherein, the first identification information is used for the server to establish a binding relationship between the first device and a second device as the device for smart home, the binding relationship indicating that the first device and the second device belong to the same user.

Optionally, in an embodiment, the binding device 200 further comprises a second transmitting unit operative to transmit user identification information to the server through the second data channel, wherein, the user identification information is used for the server to establish a binding relationship between the first device, the second device and the user, the binding relationship indicating that the first device and the second device belong to the user.

Optionally, in another embodiment, the first device is connected to a third device, and the binding device 200 further comprises: a third transmitting unit operative to transmit the first identification information to the third device, the first identification information being transmitted to the server by the third device, so that the server establishes a binding relationship between the first device and the third device.

Optionally, in a further embodiment, the binding device 200 further comprises a receiving unit operative to receive a control strategy from the server; and a control unit operative to control the third device based on the control strategy, wherein the control strategy is generated by the server based on setting information transmitted by the second device.

Optionally, in a further embodiment, the server establishes the binding relationship in response to receiving the same first identification information from the first device and the second device.

Optionally, in a further embodiment, the server establishes the binding relationship in response to receiving the same first identification information from the first device and the second device and a network address for the first device and a network address for the second device being the same.

Optionally, in a further embodiment, the second device determines whether the first identification information satisfies a second predetermined condition; and transmits the first identification information to the server when it is determined that the first identification information satisfies the second predetermined condition.

The binding device according to the embodiment of the present disclosure has been described above. In the binding device according to the embodiment of the present disclosure, a certain device transmits its identification information to the server on one hand, and on the other hand broadcasts so that the device receiving the identification information transmits the identification information to the server, and the server can bind the devices transmitting the same identification information. Thereby, the user does not need to log in the server by a certain device and then input or scan the identification information of another device. The binding efficiency is improved, the user operation is decreased, and the user experience is improved.

The binding method and the binding device according to the embodiments of the present disclosure have been described above with reference to FIG. 1 and FIG. 2.

Figure 3:
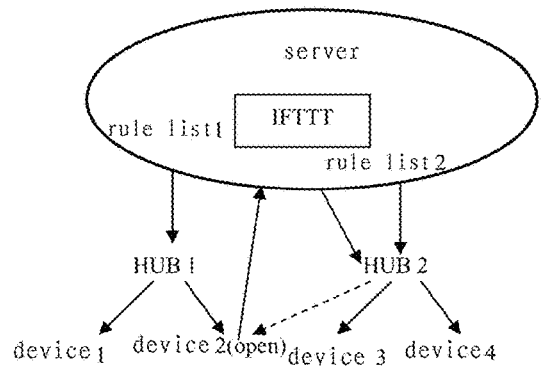
FIG. 3 is a schematic diagram of a structure of the smart home system according to an embodiment of the present disclosure.

FIG. 3 is a schematic diagram showing a structure of a smart home system according to the embodiment of the present disclosure. As shown in FIG. 3, the devices 1 and 2 of a first family is accessed to a server by a smart hub 1 of the first family, the devices 3 and 4 of a second family is accessed to the server by a smart hub 2 of the second family. The device may be a smart control device such as a gas alarm, a smart lamp, a smart TV, a smart door lock, or the like. The device has a wireless or wire communication module, and is accessed to the smart hub of each family through the wireless or wire communication module, and the smart hub of each family is connected to a remote server. When the device is accessed to the smart hub of the family, the user logs in the server by an account which is allocated to the user by the server in advance, and registers the newly accessed device to the server side. For example, the server may receive an access message from the newly accessed device through the smart hub to get aware of the newly accessed device. Taking the device 1 in the first family as an example, when the device 1 is accessed to the smart hub 1, if the device 1 is powered up, it will transmit an access message to the server through the smart hub 1. The server acquires the hardware identification of the device 1 in the access message after receiving the access message. The server may allocate a corresponding identification for the device 1, and record route information of the device 1. That is, the server records from the smart hub of which family the device 1 is accessed, the family identification to which the device 1 belongs, or the like. Thereby, the server can distinguish each device.

After the user logs in the server through his/her account, the server will find out the identification list of the devices accessed to his/her family according to the account information of the user, and, of course, also the identification list of the devices authorized to the user by other users. For example, if the user 1 of the first family authorizes the device 2 to the user 2 of the second family, when the user 2 logs in his/her account, he/she can find out the identification list of the devices (devices 3 and 4) of his/her family, and the identification of the device 2 is also included in the list.

The user 1 authorizes the devices accessed to the smart hub 1 through an application, and establishes an authorization list as shown in the following list:

User ID 1 Hub ID 1 Gadget ID 1 Authorized User ID 2 wherein, Gadget ID 1 is the identification of the device 2, and Authorized User ID 2 is the identification of the user 2 which is authorized.

The user 2 may set a link rule list for his/her devices 3 and 4 after logging in the server through his/her account. Assuming that the device 3 is a door controlling device and the device 4 is a smart lamp, the link rule may be set up as that the device 4 is turned on when the device 3 is turned on, and the device 4 is turned off when the device 3 is turned off. When the user 2 comes back home and unlock the door, the door controlling device detects that the door is open and transmits information to the server through the smart hub2 indicating that the device 3 is turned on. The server determines that the device 4 also needs to be turned on according to the link rule described above, and needs to transmit a turn-on instruction to the device 4. The server will find the route information of the device 4. When it is determined that the device 4 is accessed to the server through the smart hub2, an instruction for turning on the device 4 will be transmitted to the smart hub 2. The smart hub 2 will transmit a turn-on instruction to the device 4 according to the identification of the device 4 after receiving the turn-on instruction. The device 4 is turned on after receiving the instruction.

The user 2 may also establish a link rule for the devices authorized to him/her by other users. Taking the example in which the user 1 has authorized the device 2 to the user 2, assuming that the device 2 is a gas alarm, the user 2 may establish a link rule in which the gas alarm of the user 2 (not shown) sends out alarm information when the device 2 detects that the gas intensity is beyond a preset threshold. For example, the user 1 and the user 2 are neighbors. When the gas is leaked out in the family of the user 1, the security of the user 2 may be threatened. In this way, when the device 2 detects that the gas intensity is beyond the preset threshold, it sends out alarm information to the server. The server finds out the link rule related to the device 2 after receiving the alarm information, and determines that an alarm instruction needs to be transmitted to the gas alarm of the user 2 when the device 2 sends out the alarm information. The server determines that the gas alarm of the user 2 is accessed to the server by the smart hub 2 through the identification information of the gas alarm of the user 2. Then, the server transmits the instruction information indicating that the gas alarm of the user 2 has alarmed to the smart hub 2. The smart hub 2 determines the interface information by the identification of the gas alarm of the user 2 after receiving the instruction information, and sends out the alarm instruction to the gas alarm of the user 2 through the interface. The gas alarm of the user 2 sends out the alarm after receiving the alarm instruction.

Hereinafter, the essential of the technical solution of the embodiment of the present disclosure will be described in detail by way of specific examples.

Figure 4:
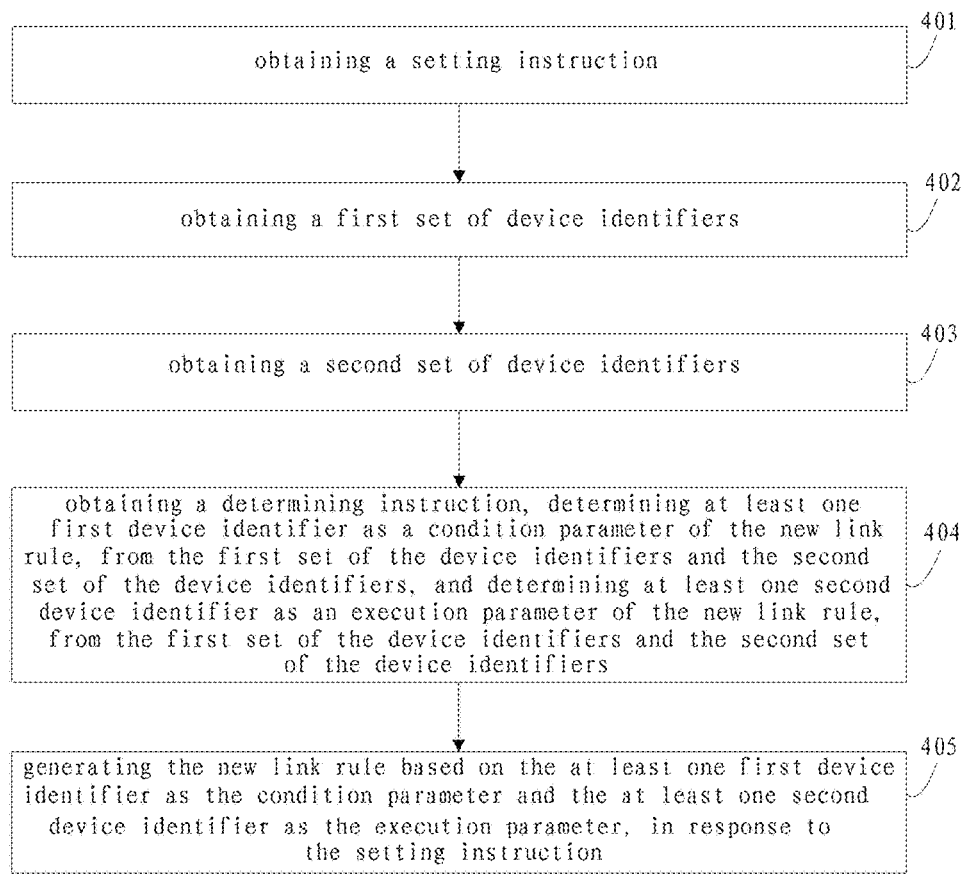
FIG. 4 is a flowchart showing a link rule setting method for smart home according to a first embodiment of the present disclosure.

FIG. 4 is a flowchart showing a link rule setting method for devices in smart home according to a first embodiment of the present disclosure. As shown in FIG. 4, the link rule setting method of devices in smart home in the example includes the following steps.

In a step 401, a setting instruction is obtained.

The setting instruction is used for instructing to set up and to generate a new link rule.

In the embodiment of the present disclosure, when the user needs to set the new link rule, he/she logs in the server side by his/her ID, and inputs the setting instruction to the server.

In a step 402, a first set of device identifications is obtained.

Each of the device identification corresponds to a device, the devices corresponding to the first set of device identifications belonging to a first family.

When the setting instruction for the new link rule is received, the server acquires the first set of device identifications. For example, when the first user transmits the setting instruction to the server, he/she may obtain the first set of device identifications through the user ID input by the first user. That is, the user ID of the first user is the first set of device identifications. Generally, all devices in each family are associated with the user ID of the family, so that it is convenient for the user to control the devices of his/her family and setting the link rule.

Generally, all devices of each family are connected to the server by one or more smart hubs, so that it is convenient for the user to control the devices in his/her family remotely. For example, if the user goes out temporally and does not turn off the smart lamp in the family and the user cannot go home due to some emergency issue, he may set up a link rule that the lamp is turned off automatically when the door is closed, so that the lamp which was not turned off previously is turned off.

In a step 403, a second set of device identifications is obtained.

Each of the device identification corresponds to a device, the devices corresponding to the second set of device identifications belonging to a second family.

In the embodiment of the present disclosure, the second set of device identifications is a set of devices belonging to the second family which are authorized to the first user by the second user, so that the first user may establish a link rule between the device in the first set of device identifications and the device in the second set of device identifications, and the devices of both users may be linked together.

Assuming that the user B needs to go out for a period of time and authorizes his/her door lock to the user A. The user A establishes a link rule for the door lock of the user B and the door lock of his/her own family. When the door of the user B is open resulting in an alarm, the door of the user's A also sends out an alarm. Therefore, the user A may monitor the door of the user B to ensure the security of the family of the user B.

When the user B authorizes the device to the user A and the user A logs into the server by his/her ID, the server will find out the device authorized to him/her with the ID of the user A as a detection condition, and shows it to the user A, so that it is convenient for the user A to link his own device with the device of the user B.

In a step 404, a determining instruction is obtained, at least one first device identification is determined as a condition parameter of the new link rule, from the first set of device identifications and the second set of device identifications, and at least one second device identification is determined as an execution parameter of the new link rule, from the first set of device identifications and the second set of the device identification.

In the embodiment of the present disclosure, when the user selects his/her device to establish a link rule with the device authorized to him/her by others, the server will make the identification of the first device as the condition parameter of the new link rule, and make the identification of the second device as the execution parameter of the new link rule to form the new link rule.

Assuming that the gas detector of the user A is linked with the gas detector of the user B, when the gas detector of the user A detects that the gas proportion in the air is beyond a preset threshold, it will send out an alarm. The server determines that the gas detector of the user A alarms and the gas detector of the user A is linked with the gas detector of the user B. Then, the server triggers the link rule with the alarm by the gas detector of the user A as the input parameter, and an alarm instruction is output to the gas detector of the user B, so that the gas detector of the user B sends out an alarm too, to alert the user B to take some precautions, wherein the execution parameter of the new link rule is to make the gas detector of the user B send out the alarm.

In a step 405, the new link rule is generated based on the at least one first device identification as the condition parameter and the at least one second device identification as the execution parameter, in response to the setting instruction.

The new link rule is used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

In the embodiment of the present disclosure, the instruction is set up based on the link rule input by the user. The server establishes the link rule between the first device and the second device, so as to link different devices in different families. For example, when a link rule is established between the faucet in the parents' family and the faucet in his/her own family, if the faucet in the parents' family is open up to a preset threshold, for example, 15 minutes, the alarm is sent out. The server will instruct the faucet in the user's family to send out the alarm according to the link rule, so that it is convenient for the user to get aware of the condition in the parents' family and to take an action in time.

In the embodiment of the present disclosure, the user authorizes the device to other users, and the authorized user may establish a link rule between the device in his/her own family and the authorized device, the scenario in which the device is applied is enriched, it is convenient for the user to associate with each other to realize an early warning cooperatively, and to improve the security of the users.

Figure 5:
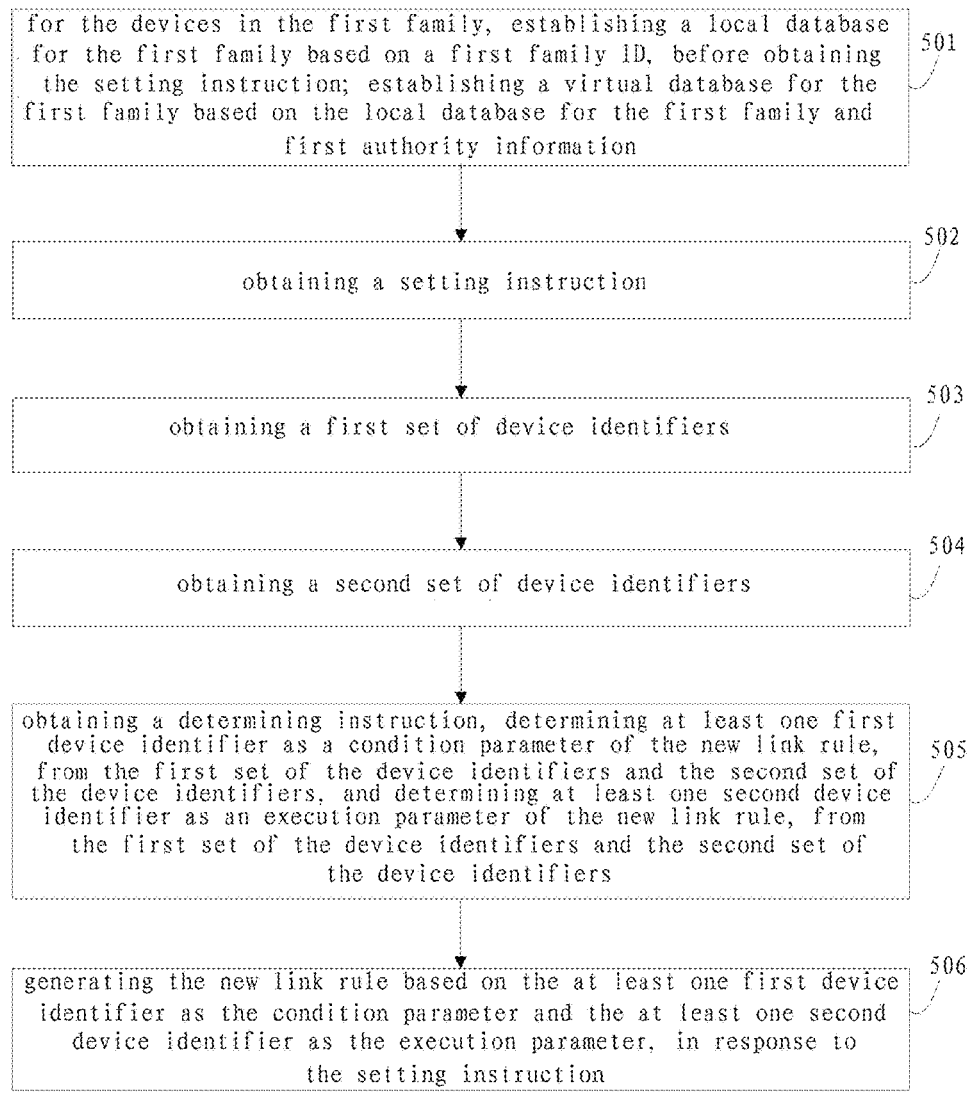
FIG. 5 is a flowchart showing a link rule setting method for smart home according to a second embodiment of the present disclosure.

FIG. 5 is a flowchart showing the link rule setting method according to a second embodiment of the present disclosure. As shown in FIG. 5, the link rule setting method according to this example comprises the following steps.

In a step 501, for the devices in the first family, a local database for the first family is established based on a first family ID; a virtual database for the first family is established based on the local database for the first family and first authority information; for the devices in the second family, a local database is established for the second family based on a second family ID; a virtual database for the second family is established based on the local database for the second family and second authority information.

In the embodiment of the present disclosure, the first authority information is an ID of any one family or a geographic location range. The second authority information may be the ID of the first family, or, the devices in an authorized geographic range, such as 300 meters, are authorized by default.

In the embodiment of the present disclosure, the identification is set up for the user correspondingly with the family as a unit, so that it is convenient for the user to manage the devices in his/her family and the devices authorized by others based on his/her identification information. The family ID and the user ID may be the same, or may be consistent with each other.

In the embodiment of the present disclosure, before the user establishes the link rule through the server, a device database is required to be established. That is, before the user establishes the link rule, he/she needs to acquire the devices which may be used to establish the link rule. The devices include the devices in his/her family or the devices authorized to him/her by others. The devices authorized to him/her by others are virtualized devices, that is, indicating that the devices do not belong to his/her own family.

When the user logs with his/her ID, the server will find out all the devices connected to the smart hub belonging to the user's ID according to the user's ID, and form the local database with all the device identifications belonging to the user's family. Then, the server will make the user ID as an inquiry condition to find all the devices authorized to the user ID by others, and form the virtual database with all the authorized device identifications.

In the embodiment of the present disclosure, the devices authorized to the other user do not need to make the user ID as the authorization condition, and the property information, such as the geographic location information, of the smart hub connected with the device may be the authorization condition. For example, all the families within 100 meters from his/her family may be authorized. For a certain building, the gas detectors in the whole building may be linked. When an abnormal condition occurs in a certain family, it is necessary to inform other families of the fire alarm, and the neighbors need to take some precautions to avoid any loss. At this time, the devices such as the gas detectors within 100 meters from the user's family may be determined through the registration location information of the smart hub of the family, and the corresponding device is authorized, so that the link rule may be established between the devices in different families close to each other, and the alarm may be sent out cooperatively to secure the family.

After the user is registered, the server may find the authorization condition of the device in other families according to the registration location information of the smart hub in the user's family. When the authorization condition is a distance range authorization, the devices satisfying the authorization condition are determined according to the registration location of the smart hub to which the authorized device belongs, and the virtual database is established when the user to which the devices satisfying the authorization condition belong is logged, so that it is convenient for the authorized user to establish the link rule between the local device in the local database with the devices of others.

In a step 502, a setting instruction is obtained.

The setting instruction is used for instructing to set up and to generate a new link rule.

In the embodiment of the present disclosure, when the user needs to set the new link rule, he/she logs in the server side by his/her ID, and inputs the setting instruction to the server.

In a step 503, a first set of device identifications is obtained.

Each of the device identification corresponds to a device, the devices corresponding to the first set of device identifications belonging to a first family.

When the setting instruction for the new link rule is received, the server acquires the first set of device identifications. For example, when the first user transmits the setting instruction to the server, he/she may obtain the first set of device identifications through the user ID input by the first user. That is, the user ID of the first user is the first set of device identifications. Generally, all devices in each family are associated with the user ID of the family, so that it is convenient for the user to control the devices of his/her family and setting the link rule.

Generally, all devices of each family are connected to the server by one or more smart hubs, so that it is convenient for the user to control the devices in his/her family. For example, if the user goes out temporally and does not turn off the smart lamp in the family and the user cannot go home due to some emergency issue, he may set up that the lamp is turned off automatically when the door is closed by the link rule, so that the lamp which was not turned off previously is turned off.

In a step 504, a second set of device identifications is obtained.

Each of the device identification corresponds to a device, the devices corresponding to the second set of device identifications belonging to a second family.

In the embodiment of the present disclosure, the second set of device identifications is a set of devices belonging to the second family which are authorized to the first user by the second user, so that the first user may establish a link rule between the device in the first set of device identifications and the device in the second set of device identifications, and the devices of both users may be linked together.

Assuming that the user B needs to go out for a period of time and authorizes his/her door lock to the user A. The user A establishes a link rule for the door lock of the user B and the door lock of his/her own family. When the door of the user B is open resulting in an alarm, the door of the user's A also sends out an alarm. Therefore, the user A may monitor the door of the user B to ensure the security of the family of the user B.

When the user B authorizes the device to the user A and the user A logs into the server by his/her ID, the server will find out the device authorized to him/her with the ID of the user A as a detection condition, and shows it to the user A, so that it is convenient for the user A to link his own device with the device of the user B.

In a step 505, a determining instruction is obtained, at least one first device identification is determined as a condition parameter of the new link rule, from the first set of device identifications and the second set of device identifications, and at least one second device identification is determined as an execution parameter of the new link rule, from the first set of device identifications and the second set of the device identification.

In the embodiment of the present disclosure, when the user selects his/her device to establish a link rule with the device authorized to him/her by others, the server will make the identification of the first device as the condition parameter of the new link rule, and make the identification of the second device as the execution parameter of the new link rule to form the new link rule.

Assuming that the gas detector of the user A is linked with the gas detector of the user B, when the gas detector of the user A detects that the gas proportion in the air is beyond a preset threshold, it will send out an alarm. The server determines that the gas detector of the user A alarms and the gas detector of the user A is linked with the gas detector of the user B. Then, the server triggers the link rule with the alarm by the gas detector of the user A as the input parameter, and an alarm instruction is output to the gas detector of the user B, so that the gas detector of the user B sends out an alarm too, to alert the user B to take some precautions, wherein the execution parameter of the new link rule is to make the gas detector of the user B send out the alarm.

In a step 506, the new link rule is generated based on the at least one first device identification as the condition parameter and the at least one second device identification as the execution parameter, in response to the setting instruction.

The new link rule is used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

In the embodiment of the present disclosure, the instruction is set up based on the link rule input by the user. The server establishes the link rule between the first device and the second device, so as to link different devices in different families. For example, when a link rule is established between the faucet in the parents' family and the faucet in his/her own family, if the faucet in the parents' family is open up to a preset threshold, for example, 15 minutes, the alarm is sent out. The server will instruct the faucet in the user's family to send out the alarm according to the link rule, so that it is convenient for the user to get aware of the condition in the parents' family and to take an action in time.

In the embodiment of the present disclosure, the user authorizes the device to other users, and the authorized user may establish a link rule between the device in his/her own family and the authorized device, the scenario in which the device is applied is enriched, it is convenient for the user to associate with each other to realize the alarm, and improve the security of the users.

Figure 6:
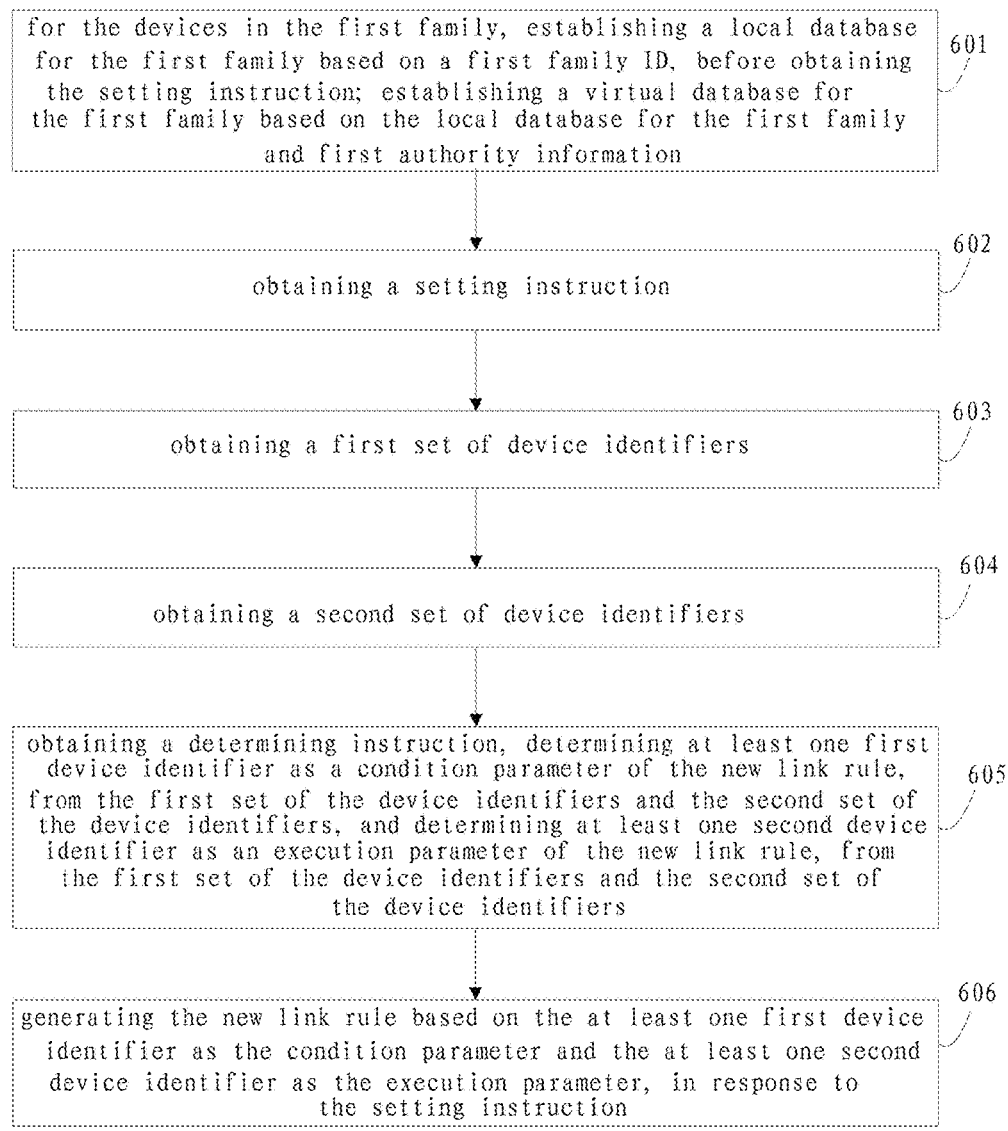
FIG. 6 is a flowchart showing a link rule setting method for smart home according to a third embodiment of the present disclosure.

FIG. 6 is a flowchart showing the link rule setting method according to a third embodiment of the present disclosure. As shown in FIG. 6, the link rule setting method according to this example comprises the following steps.

In a step 601, for the devices in the first family, a local database for the first family is established based on a first family ID; a virtual database for the first family is established based on the local database for the first family and first authority information; for the devices in the second family, a local database is established for the second family based on a second family ID; a virtual database for the second family is established based on the local database for the second family and second authority information.

In the embodiment of the present disclosure, the first authority information is an ID of any one family or a geographic location range. The second authority information may be the ID of the first family, or, the devices in an authorized geographic range, such as 300 meters, are authorized by default.

In the embodiment of the present disclosure, the identification is set up for the user correspondingly with the family as a unit, so that it is convenient for the user to manage the devices in his/her family and the devices authorized by others based on his/her identification information. The family ID and the user ID may be the same, or may be consistent with each other.

In the embodiment of the present disclosure, before the user establishes the link rule through the server, a device database is required to be established. That is, before the user establishes the link rule, he/she needs to acquire the devices which may be used to establish the link rule. The devices include the devices in his/her family or the devices authorized to him/her by others. The devices authorized to him/her by others are virtualized devices, that is, indicating that the devices do not belong to his/her own family.

When the user logs with his/her ID, the server will find out all the devices connected to the smart hub belonging to the user's ID according to the user's ID, and form the local database with all the device identifications belonging to the user's family. Then, the server will make the user ID as an inquiry condition to find all the devices authorized to the user ID by others, and form the virtual database with all the authorized device identifications.

In a step 602, a setting instruction is obtained.

The setting instruction is used for instructing to set up and to generate a new link rule.

In the embodiment of the present disclosure, when the user needs to set the new link rule, he/she logs in the server side by his/her ID, and inputs the setting instruction to the server.

In a step 603, a first set of device identifications is obtained.

Each of the device identification corresponds to a device, the devices corresponding to the first set of device identifications belonging to a first family.

A screening parameter is obtained as the first family ID.

The local database for the first family is invoked based on the screening parameter. That is, all the devices connected to the smart hub of the user of the first family are determined and are rendered to the user of the first family as the local database.

When the setting instruction for the new link rule is received, the server acquires the first set of device identifications. For example, when the first user transmits the setting instruction to the server, he/she may obtain the first set of device identifications through the user ID input by the first user. That is, the user ID of the first user is the first set of device identifications. Generally, all devices in each family are associated with the user ID of the family, so that it is convenient for the user to control the devices of his/her family and setting the link rule.

Generally, all devices of each family are connected to the server by one or more smart hubs, so that it is convenient for the user to control the devices in his/her family. For example, if the user goes out temporally and does not turn off the smart lamp in the family and the user cannot go home due to some emergency issue, he may set up that the lamp is turned off automatically when the door is closed by the link rule, so that the lamp which was not turned off previously is turned off.

In a step 604, a second set of device identifications is obtained.

Each of the device identification corresponds to a device, the devices corresponding to the second set of device identifications belonging to a second family.

The virtual database for the second family is determined based on the screening parameter in the step 603; wherein, the second authority information of the virtual database for the second family is matched with the screening parameter.

The virtual database is invoked and is rendered to the user of the first family.

In the embodiment of the present disclosure, the second set of device identifications is a set of devices belonging to the second family which are authorized to the first user by the second user, so that the first user may establish a link rule between the device in the first set of device identifications and the device in the second set of device identifications, and the devices of both users may be linked together.

Assuming that the user B needs to go out for a period of time and authorizes his/her door lock to the user A. The user A establishes a link rule for the door lock of the user B and the door lock of his/her own family. When the door of the user B is open resulting in an alarm, the door of the user's A also sends out an alarm. Therefore, the user A may monitor the door of the user B to ensure the security of the family of the user B.

When the user B authorizes the device to the user A and the user A logs into the server by his/her ID, the server will find out the device authorized to him/her with the ID of the user A as a detection condition, and shows it to the user A, so that it is convenient for the user A to link his own device with the device of the user B.

In a step 605, a determining instruction is obtained, at least one first device identification is determined as a condition parameter of the new link rule, from the first set of device identifications and the second set of device identifications, and at least one second device identification is determined as an execution parameter of the new link rule, from the first set of device identifications and the second set of the device identification.

In the embodiment of the present disclosure, when the user selects his/her device to establish a link rule with the device authorized to him/her by others, the server will make the identification of the first device as the condition parameter of the new link rule, and make the identification of the second device as the execution parameter of the new link rule to form the new link rule.

Assuming that the gas detector of the user A is linked with the gas detector of the user B, when the gas detector of the user A detects that the gas proportion in the air is beyond a preset threshold, it will send out an alarm. The server determines that the gas detector of the user A alarms and the gas detector of the user A is linked with the gas detector of the user B. Then, the server triggers the link rule with the alarm by the gas detector of the user A as the input parameter, and an alarm instruction is output to the gas detector of the user B, so that the gas detector of the user B sends out an alarm too, to alert the user B to take some precautions, wherein the execution parameter of the new link rule is to make the gas detector of the user B send out the alarm.

In a step 606, the new link rule is generated based on the at least one first device identification as the condition parameter and the at least one second device identification as the execution parameter, in response to the setting instruction.

The new link rule is used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

In the embodiment of the present disclosure, the instruction is set up based on the link rule input by the user. The server establishes the link rule between the first device and the second device, so as to link different devices in different families. For example, when a link rule is established between the faucet in the parents' family and the faucet in his/her own family, if the faucet in the parents' family is open up to a preset threshold, for example, 15 minutes, the alarm is sent out. The server will instruct the faucet in the user's family to send out the alarm according to the link rule, so that it is convenient for the user to get aware of the condition in the parents' family and to take an action in time.

In the embodiment of the present disclosure, the user authorizes the device to other users, and the authorized user may establish a link rule between the device in his/her own family and the authorized device, the scenario in which the device is applied is enriched, it is convenient for the user to associate with each other to realize the alarm, and improve the security of the users.

Figure 7:
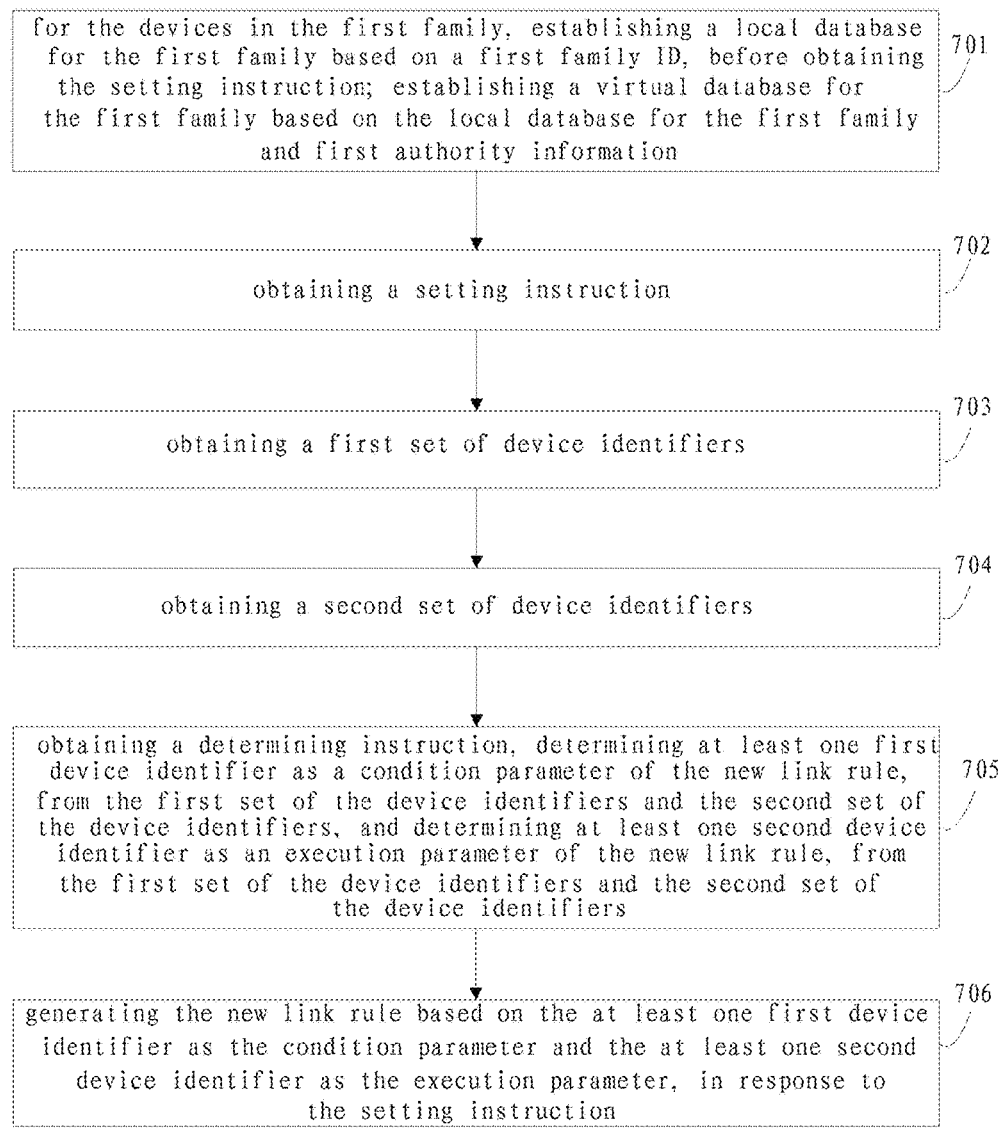
FIG. 7 is a flowchart showing a link rule setting method for smart home according to a fourth embodiment of the present disclosure.

FIG. 7 is a flowchart showing the link rule setting method according to a fourth embodiment of the present disclosure. As shown in FIG. 7, the link rule setting method according to this example comprises the following steps.

In a step 701, for the devices in the first family, a local database for the first family is established based on a first family ID; a virtual database for the first family is established based on the local database for the first family and first authority information; for the devices in the second family, a local database is established for the second family based on a second family ID; a virtual database for the second family is established based on the local database for the second family and second authority information.

In the embodiment of the present disclosure, the first authority information is an ID of any one family or a geographic location range. The second authority information may be the ID of the first family, or, the devices in an authorized geographic range, such as 300 meters, are authorized by default.

In the embodiment of the present disclosure, the identification is set up for the user correspondingly with the family as a unit, so that it is convenient for the user to manage the devices in his/her family and the devices authorized by others based on his/her identification information. The family ID and the user ID may be the same, or may be consistent with each other.

In the embodiment of the present disclosure, before the user establishes the link rule through the server, a device database is required to be established. That is, before the user establishes the link rule, he/she needs to acquire the devices which may be used to establish the link rule. The devices include the devices in his/her family or the devices authorized to him/her by others. The devices authorized to him/her by others are virtualized devices, that is, indicating that the devices do not belong to his/her own family.

When the user logs with his/her ID, the server will find out all the devices connected to the smart hub belonging to the user's ID according to the user's ID, and form the local database with all the device identifications belonging to the user's family. Then, the server will make the user ID as an inquiry condition to find all the devices authorized to the user ID by others, and form the virtual database with all the authorized device identifications.

In a step 702, a setting instruction is obtained.

The setting instruction is used for instructing to set up and to generate a new link rule.

In the embodiment of the present disclosure, when the user needs to set the new link rule, he/she logs in the server side by his/her ID, and inputs the setting instruction to the server.

In a step 703, a first set of device identifications is obtained.

Each of the device identification corresponds to a device, the devices corresponding to the first set of device identifications belonging to a first family.

When the setting instruction for the new link rule is received, the server acquires the first set of device identifications. For example, when the first user transmits the setting instruction to the server, he/she may obtain the first set of device identifications through the user ID input by the first user. That is, the user ID of the first user is the first set of device identifications. Generally, all devices in each family are associated with the user ID of the family, so that it is convenient for the user to control the devices of his/her family and setting the link rule.

Generally, all devices of each family are connected to the server by one or more smart hubs, so that it is convenient for the user to control the devices in his/her family. For example, if the user goes out temporally and does not turn off the smart lamp in the family and the user cannot go home due to some emergency issue, he may set up that the lamp is turned off automatically when the door is closed by the link rule, so that the lamp which was not turned off previously is turned off.

In a step 704, a second set of device identifications is obtained.

Each of the device identification corresponds to a device, the devices corresponding to the second set of device identifications belonging to a second family.

In the embodiment of the present disclosure, first, location information indicating a geographic location of the first family is determined based on the first set of device identifications. For example, the smart hub to which the device is connected is determined through the device identification. The location information of the device is determined through the registration location information of the smart hub. That is, the registration location information of the smart hub is the location information of the device, i.e., the family location information of the user.

The location information of the first family is determined as the screening parameter. The virtual database for the second family is determined based on the screening parameter, wherein the second authority information of the virtual database for the second family is matched with the screening parameter. The virtual database is invoked to be rendered to the user of the first family.

In the embodiment of the present disclosure, the second set of device identifications is a set of devices belonging to the second family which are authorized to the first user by the second user, so that the first user may establish a link rule between the device in the first set of device identifications and the device in the second set of device identifications, and the devices of both users may be linked together.

In the embodiment of the present disclosure, the devices authorized to the other user does not need to make the user ID as the authorization condition, and the property information, such as the geographic location information, on the smart hub connected with the device may be the authorization condition. For example, all the families within 100 meters from his/her family may be authorized. For a certain building, the gas detectors in the whole building may be linked. When an abnormal condition occurs in a certain family, it is necessary to inform other families of the fire alarm, and the neighbors need to take some precautions to avoid any loss. At this time, the devices such as the gas detectors within 100 meters from the user's family may be determined through the registration location information on the smart hub of the family, and the corresponding device is authorized, so that the link rule may be established between the devices in different families close to each other, and the alarm may be sent out to secure the family.

After the user is registered, the server may find the authorization condition of the device in other families according to the registration location information of the smart hub in the user's family. When the authorization condition is a distance range authorization, the devices satisfying the authorization condition are determined according to the registration location of the smart hub to which the authorized device belongs, and the virtual database is established when the user of the devices satisfying the authorization condition is logged, so that it is convenient for the authorized user to establish the link rule between the local device in the local database with the devices of others.

Assuming that the user B needs to go out for a period of time and authorizes his/her door lock to the user A. The user A establishes a link rule for the door lock of the user B and the door lock of his/her own family. When the door of the user B is open resulting in an alarm, the door of the user's A also sends out an alarm. Therefore, the user A may monitor the door of the user B to ensure the security of the family of the user B.

When the user B authorizes the device to the user A and the user A logs into the server by his/her ID, the server will find out the device authorized to him/her with the ID of the user A as a detection condition, and shows it to the user A, so that it is convenient for the user A to link his own device with the device of the user B.

In a step 705, a determining instruction is obtained, at least one first device identification is determined as a condition parameter of the new link rule, from the first set of device identifications and the second set of device identifications, and at least one second device identification is determined as an execution parameter of the new link rule, from the first set of device identifications and the second set of the device identification.

In the embodiment of the present disclosure, when the user selects his/her device to establish a link rule with the device authorized to him/her by others, the server will make the identification of the first device as the condition parameter of the new link rule, and make the identification of the second device as the execution parameter of the new link rule to form the new link rule.

Assuming that the gas detector of the user A is linked with the gas detector of the user B, when the gas detector of the user A detects that the gas proportion in the air is beyond a preset threshold, it will send out an alarm. The server determines that the gas detector of the user A alarms and the gas detector of the user A is linked with the gas detector of the user B. Then, the server triggers the link rule with the alarm by the gas detector of the user A as the input parameter, and an alarm instruction is output to the gas detector of the user B, so that the gas detector of the user B sends out an alarm too, to alert the user B to take some precautions, wherein the execution parameter of the new link rule is to make the gas detector of the user B send out the alarm.

In a step 706, the new link rule is generated based on the at least one first device identification as the condition parameter and the at least one second device identification as the execution parameter, in response to the setting instruction.

The new link rule is used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

In the embodiment of the present disclosure, the instruction is set up based on the link rule input by the user. The server establishes the link rule between the first device and the second device, so as to link different devices in different families. For example, when a link rule is established between the faucet in the parents' family and the faucet in his/her own family, if the faucet in the parents' family is open up to a preset threshold, for example, 15 minutes, the alarm is sent out. The server will instruct the faucet in the user's family to send out the alarm according to the link rule, so that it is convenient for the user to get aware of the condition in the parents' family and to take an action in time.

In the embodiment of the present disclosure, the user authorizes the device to other users, and the authorized user may establish a link rule between the device in his/her own family and the authorized device, the scenario in which the device is applied is enriched, it is convenient for the user to associate with each other to realize the alarm, and improve the security of the users.

Figure 8:
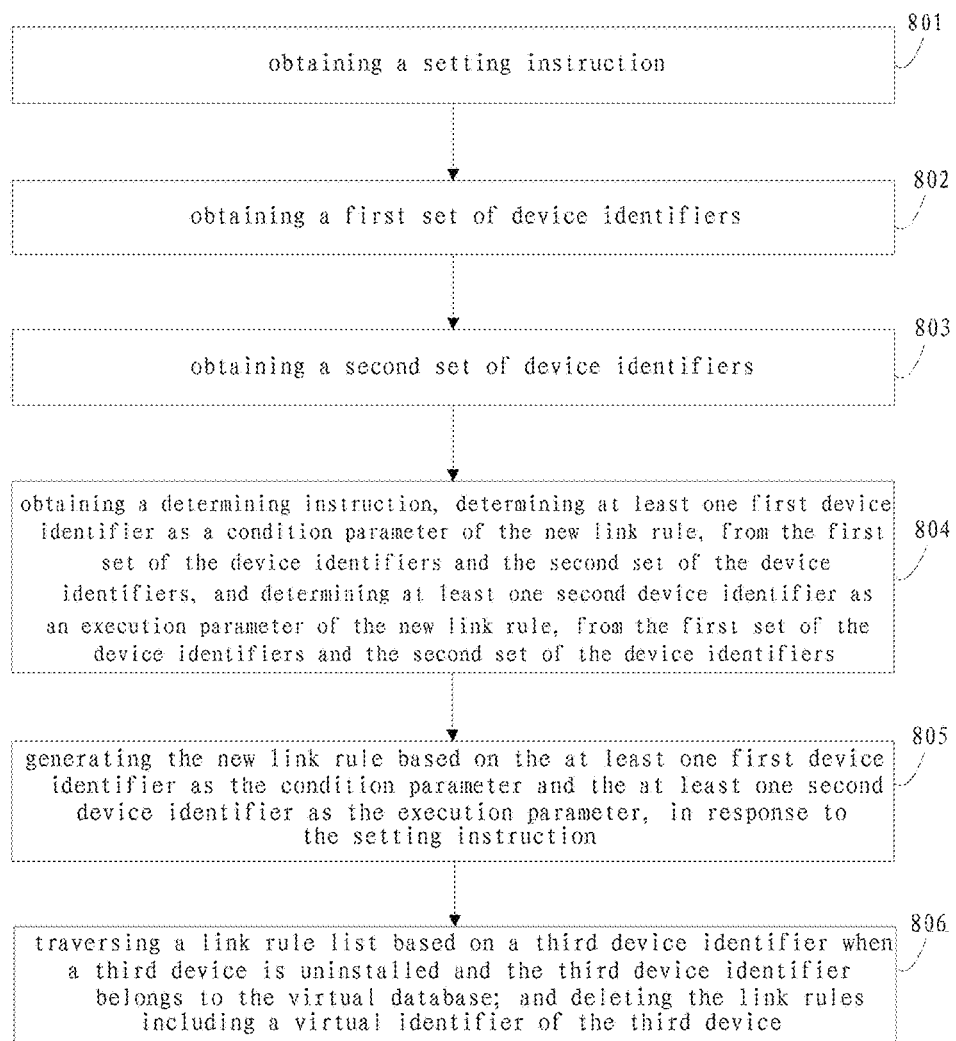
FIG. 8 is a flowchart showing a link rule setting method for smart home according to a fifth embodiment of the present disclosure.

FIG. 8 is a flowchart showing the link rule setting method according to a fifth embodiment of the present disclosure. As shown in FIG. 8, the link rule setting method according to this example comprises the following steps.

In a step 801, a setting instruction is obtained.

The setting instruction is used for instructing to set up and to generate a new link rule.

In the embodiment of the present disclosure, when the user needs to set the new link rule, he/she logs in the server side by his/her ID, and inputs the setting instruction to the server.

In a step 802, a first set of device identifications is obtained.

Each of the device identification corresponds to a device, the devices corresponding to the first set of device identifications belonging to a first family.

When the setting instruction for the new link rule is received, the server acquires the first set of device identifications. For example, when the first user transmits the setting instruction to the server, he/she may obtain the first set of device identifications through the user ID input by the first user. That is, the user ID of the first user is the first set of device identifications. Generally, all devices in each family are associated with the user ID of the family, so that it is convenient for the user to control the devices of his/her family and setting the link rule.

Generally, all devices of each family are connected to the server by one or more smart hubs, so that it is convenient for the user to control the devices in his/her family. For example, if the user goes out temporally and does not turn off the smart lamp in the family and the user cannot go home due to some emergency issue, he may set up that the lamp is turned off automatically when the door is closed by the link rule, so that the lamp which was not turned off previously is turned off.

In a step 803, a second set of device identifications is obtained.

Each of the device identification corresponds to a device, the devices corresponding to the second set of device identifications belonging to a second family.

In the embodiment of the present disclosure, the second set of device identifications is a set of devices belonging to the second family which are authorized to the first user by the second user, so that the first user may establish a link rule between the device in the first set of device identifications and the device in the second set of device identifications, and the devices of both users may be linked together.

Assuming that the user B needs to go out for a period of time and authorizes his/her door lock to the user A. The user A establishes a link rule for the door lock of the user B and the door lock of his/her own family. When the door of the user B is open resulting in an alarm, the door of the user's A also sends out an alarm. Therefore, the user A may monitor the door of the user B to ensure the security of the family of the user B.

When the user B authorizes the device to the user A and the user A logs into the server by his/her ID, the server will find out the device authorized to him/her with the ID of the user A as a detection condition, and shows it to the user A, so that it is convenient for the user A to link his own device with the device of the user B.

In a step 804, a determining instruction is obtained, at least one first device identification is determined as a condition parameter of the new link rule, from the first set of device identifications and the second set of device identifications, and at least one second device identification is determined as an execution parameter of the new link rule, from the first set of device identifications and the second set of the device identification.

In the embodiment of the present disclosure, when the user selects his/her device to establish a link rule with the device authorized to him/her by others, the server will make the identification of the first device as the condition parameter of the new link rule, and make the identification of the second device as the execution parameter of the new link rule to form the new link rule.

Assuming that the gas detector of the user A is linked with the gas detector of the user B, when the gas detector of the user A detects that the gas proportion in the air is beyond a preset threshold, it will send out an alarm. The server determines that the gas detector of the user A alarms and the gas detector of the user A is linked with the gas detector of the user B. Then, the server triggers the link rule with the alarm by the gas detector of the user A as the input parameter, and an alarm instruction is output to the gas detector of the user B, so that the gas detector of the user B sends out an alarm too, to alert the user B to take some precautions, wherein the execution parameter of the new link rule is to make the gas detector of the user B send out the alarm.

In a step 805, the new link rule is generated based on the at least one first device identification as the condition parameter and the at least one second device identification as the execution parameter, in response to the setting instruction.

The new link rule is used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

In the embodiment of the present disclosure, the instruction is set up based on the link rule input by the user. The server establishes the link rule between the first device and the second device, so as to link different devices in different families. For example, when a link rule is established between the faucet in the parents' family and the faucet in his/her own family, if the faucet in the parents' family is open up to a preset threshold, for example, 15 minutes, the alarm is sent out. The server will instruct the faucet in the user's family to send out the alarm according to the link rule, so that it is convenient for the user to get aware of the condition in the parents' family and to take an action in time.

In a step 806, a link rule list is traversed based on a third device identification when a third device is uninstalled and the third device identification belongs to the virtual database; and the link rules including a virtual identification of the third device are deleted.

In the embodiment of the present disclosure, when a certain user deletes the third device in his/her own family or the third device has a malfunction or is uninstalled by the user, the server needs to be informed of the information on the un-installation of the third device, so that the server may delete the link rules associated with the third device to prevent the server from still maintaining these link rules and to avoid that the other user unknown of the situation still regards the link rule associated with the third device as active so as to avoid unnecessary troubles.

For example, when the gas detector in the user A's family is broken, the user may log into the server to inform the server of the malfunction of the gas detector. The server makes the gas detector of the user A as an inquiry condition to inquiry about all the link rules set up by the other users associated with the gas detector of the user A, and may delete the link rule associated with the gas detector of the user A and set up by the user A himself.

As an example, the server further makes the identification of the gas detector of the user A as the inquiry condition to find the virtual database of the other user comprising the identification of the gas detector of the user A, so as to delete the identification of the gas detector of the user A in the virtual database, so that it prevents other users from performing an error operation on the gas detector of the user A, and ensures that other users won't add any link rule associated with the gas detector of the user A any longer.

In the embodiment of the present disclosure, the user authorizes the device to other users, and the authorized user may establish a link rule between the device in his/her own family and the authorized device, the scenario in which the device is applied is enriched, it is convenient for the user to associate with each other to realize the alarm, and improve the security of the users.

The embodiment of the present disclosure may be applied in a scenario in which an old man authorizes an attribute of his/her health detector to his/her child and his/her child may get information on his/her parent's information on blood pressure, blood glucose or the like. The child may set up his/her parent's health detector to be alarmed upon a certain message. When it is detected that a certain body parameter reaches a certain threshold automatically, the alarm will be triggered.

When a friend of the user A comes by to the user A's home and the user A is not at home, the friend requests a temporary management authority of the door lock to the user A. If the user A permits, the friend may go into the user A's home by unlocking the door lock through a client. Of course, the user A may make the lamp turn on and the door unlocked for the user A by other link rule such as a rule in which the door is unlocked when the lamp is turned on. The user A may directly unlock the door remotely to let the friend go in.

If the user B needs to go out for a period of time, the user B may authorize the authority of the house security system such as a door magnetic lock, a camera, a motion sensor, or the like, to the user B's friend. The friend may monitor the house for the user B.

Figure 9:
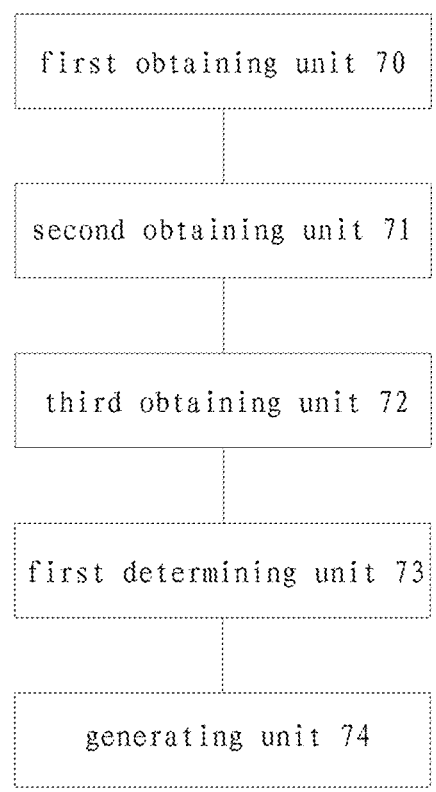
FIG. 9 is a schematic diagram showing a structure of a link rule setting apparatus according to an embodiment of the present disclosure.

FIG. 9 is a schematic diagram showing a structure of a link rule setting apparatus in the embodiment of the present disclosure. As shown in FIG. 9, the link rule setting apparatus for smart home in the embodiment of the present disclosure comprises: a first obtaining unit 90, a second obtaining unit 91, a third obtaining unit 92, a first determining unit 93 and a generating unit 94.

The first obtaining unit 90 is used to obtain a setting instruction for instructing to set up and to generate a new link rule.

The second obtaining unit 91 is used to obtain a first set of device identifications, each of which corresponds to a device, the devices corresponding to the first set of device identifications belonging to a first family.

The third obtaining unit 92 is used to obtain a second set of device identifications, each of which corresponds to a device, the devices corresponding to the second set of device identifications belonging to a second family.

The first determining unit 93 is used to obtain a determining instruction, determines at least one first device identification as a condition parameter of the new link rule, from the first set of device identifications and the second set of device identifications, and determines at least one second device identification as an execution parameter of the new link rule, from the first set of device identifications and the second set of device identifications.

The generating unit 94 is used to generate the new link rule based on the at least one first device identification as the condition parameter and the at least one second device identification as the execution parameter, in response to the setting instruction, the new link rule being used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

On the basis of the link rule setting apparatus for smart home shown in FIG. 9, the link rule setting apparatus for smart home in the embodiment of the present disclosure further comprises a first establishing unit (not shown in FIG. 9) and a second establishing unit (not shown in FIG. 9)

The first establishing unit is used to, for the devices in the first family, establish a local database for the first family based on a first family ID.

The second establishing unit is used to establish a virtual database for the first family based on the local database for the first family and first authority information, the first authority information being an ID of any one family or being a geographic location range.

On the basis of the link rule setting apparatus for smart home shown in FIG. 9, the link rule setting apparatus for smart home in the embodiment of the present disclosure further comprises a third establishing unit (not shown in FIG. 9) and a fourth establishing unit (not shown in FIG. 9).

The third establishing unit is used to, for the devices in the second family, establish a local database for the second family based on a second family ID.

The fourth establishing unit is used to establish a virtual database for the second family based on the local database for the second family and second authority information.

On the basis of the link rule setting apparatus for smart home shown in FIG. 9, the link rule setting apparatus for smart home in the embodiment of the present disclosure further comprises a fourth obtaining unit (not shown in FIG. 9) and a first invoking unit (not shown in FIG. 9).

The fourth obtaining unit is used to obtain a screening parameter as the first family ID.

The second obtaining unit 91 invokes the local database for the first family based on the screening parameter.

The third obtaining unit 92 further determines the virtual database for the second family based on the screening parameter; wherein, the second authority information of the virtual database for the second family is matched with the screening parameter.

The first invoking unit invokes the virtual database.

On the basis of the link rule setting apparatus for smart home shown in FIG. 9, the link rule setting apparatus for smart home in the embodiment of the present disclosure further comprises a second determining unit (not shown in FIG. 9) and a second invoking unit (not shown in FIG. 9).

The second determining unit determines location information indicating a geographic location of the first family based on the first set of device identifications; determines the location information of the first family as the screening parameter.

The third obtaining unit 92 further determines the virtual database for the second family based on the screening parameter, wherein the second authority information of the virtual database for the second family is matched with the screening parameter.

The second invoking unit invokes the virtual database.

On the basis of the link rule setting apparatus for smart home shown in FIG. 9, the link rule setting apparatus for smart home in the embodiment of the present disclosure further comprises a traversing unit (not shown in FIG. 9) and a deleting unit (not shown in FIG. 9).

The traversing unit is used to traverse a link rule list based on a third device identification when a third device is uninstalled and the third device identification belongs to the virtual database.

The deleting unit deletes the link rules including a virtual identification of the third device.

Those skilled in the art should understand that the functions realized by the units in the link rule setting apparatus for smart home shown in FIG. 9 may be understood with reference to the descriptions of the link rule setting method for smart home described in the above embodiments. The functions of the units in the link rule setting apparatus for smart home shown in FIG. 9 may be realized by program executed on a processor or may be realized by a specific logical circuit.

According to an embodiment of the present disclosure, a binding method is provided, comprising: obtaining first identification information for identifying a first device; broadcasting the first identification information through a first data channel, so that a second device satisfying a first predetermined condition obtains the first identification information, the first identification information being transmitted to the server by the second device; and transmitting the first identification information to a server through a second data channel, wherein, the first identification information is used for the server to establish a binding relationship between the first device and the second device, the binding relationship indicating that the first device and the second device belong to the same user.

Optionally, the method further comprises: transmitting user identification information to the server through the second data channel, wherein the user identification information is used for the server to establish a binding relationship between the first device, the second device and the user.

Optionally, the first device is connected to a third device, and the method further comprising: transmitting the first identification information to the third device, the first identification information being transmitted to the server by the third device, so that the server establishes a binding relationship between the first device and the third device.

Optionally, the binding method further comprises: receiving a control strategy from the server; and controlling the third device based on the control strategy, wherein the control strategy is generated by the server based on setting information transmitted by the second device.

Optionally, the server establishes the binding relationship in response to receiving the same first identification information from the first device and the second device.

Optionally, the server establishes the binding relationship in response to receiving the same first identification information from the first device and the second device and a network address for the first device and a network address for the second device being the same.

Optionally, the second device determines whether the first identification information satisfies a second predetermined condition; and transmits the first identification information to the server when it is determined that the first identification information satisfies the second predetermined condition.

According to another embodiment of the present disclosure, a binding device is provided, comprising: an obtaining unit operative to obtain first identification information for identifying a first device; a broadcasting unit operative to broadcast the first identification information through a first data channel, so that the second device satisfying a first predetermined condition obtains the first identification information, the first identification information being transmitted to the server by the second device; and a first transmitting unit operative to transmit the first identification information to a server through a second data channel, wherein, the first identification information is used for the server to establish a binding relationship between the first device and a second device as the device for smart home, the binding relationship indicating that the first device and the second device belong to the same user.

Optionally, the binding device further comprises a second transmitting unit operative to transmit user identification information to the server through the second data channel, wherein, the user identification information is used for the server to establish a binding relationship between the first device, the second device and the user.

Optionally, the first device is connected to a third device, and the binding device further comprises: a third transmitting unit operative to transmit the first identification information to the third device, the first identification information being transmitted to the server by the third device, so that the server establishes a binding relationship between the first device and the third device.

Optionally, the binding device further comprises a receiving unit operative to receive a control strategy from the server; and a control unit operative to control the third device based on the control strategy, wherein the control strategy is generated by the server based on setting information transmitted by the second device Optionally, the server establishes the binding relationship in response to receiving the same first identification information from the first device and the second device.

Optionally, the server establishes the binding relationship in response to receiving the same first identification information from the first device and the second device and a network address for the first device and a network address for the second device being the same.

Optionally, the second device determines whether the first identification information satisfies a second predetermined condition; and transmits the first identification information to the server when it is determined that the first identification information satisfies the second predetermined condition.

According to another embodiment of the present disclosure, a link rule setting method for smart home is provided, comprising: obtaining a setting instruction for instructing to set up and to generate a new link rule; obtaining a first set of device identifications, each of which corresponds to a device, the devices corresponding to the first set of device identifications belonging to a first family; obtaining a second set of device identifications, each of which corresponds to a device, the devices corresponding to the second set of device identifications belonging to a second family; obtaining a determining instruction, determining at least one first device identification as a condition parameter of the new link rule, from the first set of device identifications and the second set of device identifications, and determining at least one second device identification as an execution parameter of the new link rule, from the first set of device identifications and the second set of device identifications; and generating the new link rule based on the at least one first device identification as the condition parameter and the at least one second device identification as the execution parameter, in response to the setting instruction, the new link rule being used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

Optionally, the method further comprises: for the devices in the first family, establishing a local database for the first family based on a first family ID, before obtaining the setting instruction; establishing a virtual database for the first family based on the local database for the first family and first authority information, the first authority information being an ID of any one family or being a geographic location range; and/or for the devices in the second family, establishing a local database for the second family based on a second family ID; establishing a virtual database for the second family based on the local database for the second family and second authority information.

Optionally, the method further comprises: obtaining a screening parameter as the first family ID; the step of obtaining the first set of device identifications comprising: the server invoking the local database for the first family based on the screening parameter; the step of obtaining the second set of device identifications comprising: the server determining the virtual database for the second family based on the screening parameter; wherein, the second authority information of the virtual database for the second family is matched with the screening parameter; and the server invoking the virtual database.

Optionally, the method further comprises: determining location information indicating a geographic location of the first family based on the first set of device identifications; determining the location information of the first family as the screening parameter; the step of obtaining the second set of device identifications comprising: determining the virtual database for the second family based on the screening parameter, wherein the second authority information of the virtual database for the second family is matched with the screening parameter; and invoking the virtual database.

Optionally, the method further comprises: traversing a link rule list based on a third device identification when a third device is uninstalled and the third device identification belongs to the virtual database; and deleting the link rules including a virtual identification of the third device.

According to another embodiment of the present disclosure, a link rule setting apparatus for smart home is provided, comprising: a first obtaining unit, a second obtaining unit, a third obtaining unit, a first determining unit and a generating unit, wherein the first obtaining unit is used to obtain a setting instruction for instructing to set up and to generate a new link rule; the second obtaining unit is used to obtain a first set of device identifications, each of which corresponds to a device, the devices corresponding to the first set of device identifications belonging to a first family; the third obtaining unit is used to obtain a second set of device identifications, each of which corresponds to a device, the devices corresponding to the second set of device identifications belonging to a second family; the first determining unit is used to obtain a determining instruction, determines at least one first device identification as a condition parameter of the new link rule, from the first set of device identifications and the second set of device identifications, and determines at least one second device identification as an execution parameter of the new link rule, from the first set of device identifications and the second set of device identifications; and the generating unit is used to generate the new link rule based on the at least one first device identification as the condition parameter and the at least one second device identification as the execution parameter, in response to the setting instruction, the new link rule being used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

Optionally, the apparatus further comprises a first establishing unit and a second establishing unit, wherein the first establishing unit is used to, for the devices in the first family, establish a local database for the first family based on a first family ID, before obtaining the setting instruction; the second establishing unit is used to establish a virtual database for the first family based on the local database for the first family and first authority information, the first authority information being an ID of any one family or being a geographic location range.

Optionally, the apparatus further comprises a third establishing unit and a fourth establishing unit, wherein the third establishing unit is used to, for the devices in the second family, establish a local database for the second family based on a second family ID; the fourth establishing unit is used to establish a virtual database for the second family based on the local database for the second family and second authority information.

Optionally, the apparatus further comprises a fourth obtaining unit and a first invoking unit, wherein, the fourth obtaining unit is used to obtain a screening parameter as the first family ID; the second obtaining unit invokes the local database for the first family based on the screening parameter; the second obtaining unit further determines the virtual database for the second family based on the screening parameter; wherein, the second authority information of the virtual database for the second family is matched with the screening parameter; and the first invoking unit invokes the virtual database.

Optionally, the apparatus further comprises a second determining unit and a second invoking unit, wherein the second determining unit determines location information indicating a geographic location of the first family based on the first set of device identifications; determines the location information of the first family as the screening parameter; the third obtaining unit further determines the virtual database for the second family based on the screening parameter, wherein the second authority information of the virtual database for the second family is matched with the screening parameter; and invoking the virtual database.

Optionally, the apparatus further comprises a traversing unit and a deleting unit, wherein the traversing unit is used to traverse a link rule list based on a third device identification when a third device is uninstalled and the third device identification belongs to the virtual database; and deletes the link rules including a virtual identification of the third device.

It is to be noted that in the specification, the terms comprising, containing or any other variation are intended to be inclusive non-exhaustively, so that a process, a method, a product or a device comprising a series of elements not only include those elements, but may also include other elements not listed explicitly, or include elements inherent to the process, the method, the product or the device. Without any other limitation, an element limited by an expression "comprising a" does not exclude other same elements included in the process, the method, the product or the device comprising the element.

Further, it is to be noted that in the specification, the expressions similar to a first unit, a second unit are only for distinction, and do not mean that they must be realized as two or more units. In fact, the units may be realized as one single unit or multiple units as necessary.

Finally, it is to be noted that the above series process not only include the processes performed in a time order, but may also include processes in parallel or individually other than in the time order.

From the description of the embodiments, those skilled in the art may understand clearly that the present disclosure may be realized by software in combination with necessary hardware platform, and of course may all be implemented by hardware. Base on such understanding, the part of the technical solution of the disclosure which is contribute to the prior art may be embodied in the form of software product. This computer software product can be stored in a storage medium, such as a ROM/RAM, a disk, an optical disc and the like, include many instructions to cause one computer device (may be personal computer, server or network device etc.) to implement the embodiments of the disclosure or method describe by some parts of the embodiment.

In the embodiment of the present disclosure, the module may be realized by software so as to be executed by various processors. For example, an identified executable code module may comprise one or more physical or logical units of the computer instructions, which may, for example, be constructed as an object, a process or a function. Nevertheless, the executable codes of the identified module are not necessary to be located together physically, and may comprise different instructions stored at different locations, which may construct a module and achieve the predetermined purpose of the module when being combined together logically.

When the module is realized by software, considering the existing hardware manufacture process, those skilled in the art may realize its function by corresponding hardware circuits comprising the normal VLSI circuit or the existing semiconductor such as a logical chip or a transistor, or other separate elements, without the consideration of cost. The module may also be realized by a programmable hardware device, such as a field programmable gate array, a programmable array logic, or a programmable logical device, etc.

The above is only embodiments of the present disclosure. It should be noted that various modifications and alternations may be made by those of ordinary skill in the art without departing from the principle of the present disclosure, which should also be viewed as falling within the protection scope of the present disclosure.

The invention claimed is:

1. A method for a smart home comprising:
a second device obtaining first identification information for identifying a first device; and
the second device transmitting the first identification information to a server through a second data channel, wherein, the first identification information is used for the server to establish a binding relationship between the first device and the second device, the binding relationship indicating that the first device and the second device belong to the same user, wherein,
the server establishes the binding relationship in response to receiving the same first identification information from the first device and the second device, or
the server establishes the binding relationship in response to receiving the same first identification information from the first device and the second device and a network address for the first device and a network address for the second device being the same, wherein the first device and the second device are smart based devices that require establishing a binding relationship of the first device and the second device belong to a common user before the first device and the second device can be operated or controlled.

2. The method of claim 1 further comprising the first device obtaining the first identification information and broadcasting the first identification information through a first data channel, before the second device obtains the first identification information, so that the second device satisfying a first predetermined condition obtains the first identification information, the first identification information being transmitted to the server by the second device.

3. The method of claim 1 further comprising transmitting user identification information to the server through the second data channel, wherein, the user identification information is used for the server to establish a binding relationship between the first device, the second device and the user, the binding relationship indicating that the first device and the second device belong to the user.

4. The method of claim 1, wherein, the first device is connected to a third device, and the method further comprises transmitting the first identification information to the third device, the first identification information being transmitted to the server by the third device, so that the server establishes a binding relationship between the first device and the third device.

5. The method of claim 1, further comprising:
the server obtaining a setting instruction for instructing to set up and to generate a new link rule;
the server obtaining a first set of device identifications, each of which corresponds to a device, the devices corresponding to the first set of device identifications belonging to a first family;
the server obtaining a second set of device identifications, each of which corresponds to a device, the devices corresponding to the second set of device identifications belonging to a second family;
the server obtaining a determining instruction, determining at least one first device identification as a condition parameter of the new link rule, from the first set of device identifications and the second set of device identifications, and determining at least one second device identification as an execution parameter of the new link rule, from the first set of device identifications and the second set of device identifications; and
the server generating the new link rule based on the at least one first device identification as the condition parameter and the at least one second device identification as the execution parameter, in response to the setting instruction, the new link rule being used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

6. The method of claim 5, further comprising:
the server, for the devices in the first family, establishing a local database for the first family based on a first family ID, before obtaining the setting instruction;
the server establishing a virtual database for the first family based on the local database for the first family and first authority information, the first authority information being an ID of any one family or being a geographic location range; and/or
the server, for the devices in the second family, establishing a local database for the second family based on a second family ID;
the server establishing a virtual database for the second family based on the local database for the second family and second authority information.

7. The method of claim 6, further comprising:
the server obtaining a screening parameter as the first family ID;
the step of obtaining the first set of device identifications comprising the server invoking the local database for the first family based on the screening parameter;
the step of obtaining the second set of device identifications comprising the server determining the virtual database for the second family based on the screening parameter; wherein, the second authority information of the virtual database for the second family is matched with the screening parameter; and
the server invoking the virtual database.

8. The method of claim 6, further comprising:
the server determining location information indicating a geographic location of the first family based on the first set of device identifications;
the server determining the location information of the first family as the screening parameter;
the step of obtaining the second set of device identifications comprising the server determining the virtual database for the second family based on the screening parameter, wherein the second authority information of the virtual database for the second family is matched with the screening parameter; and
the server invoking the virtual database.

9. A device for a smart home comprising:
a receiving unit operative to obtain first identification information for identifying a first device; and
a transmitting unit operative to transmit the first identification information to a server through a second data channel, wherein, the first identification information is used for the server to establish a binding relationship between the first device and a second device as the device for smart home, the binding relationship indicating that the first device and the second device belong to the same user,
wherein,
the server establishes the binding relationship in response to receiving the same first identification information from the first device and the second device, or
the server establishes the binding relationship in response to receiving the same first identification information from the first device and the second device and a network address for the first device and a network address for the second device being the same,
wherein the first device and the second device are smart based devices that require establishing a binding relationship of the first device and the second device belong to a common user before the first device and the second device can be operated or controlled.

10. The device of claim 9, wherein the first device obtains the first identification information and broadcasts the first identification information through a first data channel, before the second device obtains the first identification information, so that the second device satisfying a first predetermined condition obtains the first identification information, the first identification information being transmitted to the server by the second device.

11. The device of claim 9 wherein the transmitting unit is operative to transmit user identification information to the server through the second data channel, wherein, the user identification information is used for the server to establish a binding relationship between the first device, the second device and the user, the binding relationship indicating that the first device and the second device belong to the user.

12. The device of claim 9, wherein the first device is connected to a third device, and the transmitting unit is operative to transmit the first identification information to the third device, the first identification information being transmitted to the server by the third device, so that the server establishes a binding relationship between the first device and the third device.

13. The device of claim 9, wherein,
the server obtains a setting instruction for instructing to set up and to generate a new link rule;
the server obtains a first set of device identifications, each of which corresponds to a device, the devices corresponding to the first set of device identifications belonging to a first family;
the server obtains a second set of device identifications, each of which corresponds to a device, the devices corresponding to the second set of device identifications belonging to a second family;
the server obtains a determining instruction, determines at least one first device identification as a condition parameter of the new link rule, from the first set of device identifications and the second set of device identifications, and determines at least one second device identification as an execution parameter of the new link rule, from the first set of device identifications and the second set of device identifications; and
the server generates the new link rule based on the at least one first device identification as the condition parameter and the at least one second device identification as the execution parameter, in response to the setting instruction, the new link rule being used to automatically control an execution device to change a parameter accordingly when an condition device works and changes a parameter, wherein, the condition device is a device corresponding to the at least one first device identification as the condition parameter, the execution device is a device corresponding to the at least one second device identification as the execution parameter.

14. The device of claim 13, wherein:
the server, for the devices in the first family, establishes a local database for the first family based on a first family ID, before obtaining the setting instruction;
the server establishes a virtual database for the first family based on the local database for the first family and first authority information, the first authority information being an ID of any one family or being a geographic location range; and/or
the server, for the devices in the second family, establishes a local database for the second family based on a second family ID;
the server establishes a virtual database for the second family based on the local database for the second family and second authority information.

15. The device of claim 14, wherein:
the server obtains a screening parameter as the first family ID;
the server invokes the local database for the first family based on the screening parameter;
the server determines the virtual database for the second family based on the screening parameter; wherein, the second authority information of the virtual database for the second family is matched with the screening parameter; and
the server invokes the virtual database.

16. A device comprising:
a computer having a processor; and
a non-transitory computer readable program product embodied with computer program instructions thereon, which, when being executed by the computer, performs the processes of:
a second device obtaining first identification information for identifying a first device; and
the second device transmitting the first identification information to a server through a second data channel, wherein, the first identification information is used for the server to establish a binding relationship between the first device and the second device, the binding relationship indicating that the first device and the second device belong to the same user,
wherein,
the server establishes the binding relationship in response to receiving the same first identification information from the first device and the second device, or
the server establishes the binding relationship in response to receiving the same first identification information from the first device and the second device and a network address for the first device and a network address for the second device being the same,
wherein the first device and the second device are smart based devices that require establishing a binding relationship of the first device and the second device belong to a common user before the first device and the second device can be operated or controlled.

* * * * *